United States Patent [19]

Frey

[11] 4,135,194
[45] Jan. 16, 1979

[54] ROTARY HEAD MAGNETIC RECORDING AT FIXED WAVELENGTH WITH VARYING SPEEDS

[75] Inventor: Thomas M. Frey, Brighton, N.Y.

[73] Assignee: Xerox Corporation, Stamford, Conn.

[21] Appl. No.: 747,285

[22] Filed: Dec. 3, 1976

[51] Int. Cl.² .............................................. G03G 19/00
[52] U.S. Cl. .................................................. 346/74.1
[58] Field of Search ...................... 346/74.1, 155, 156; 360/70

[56] References Cited

U.S. PATENT DOCUMENTS

| | | | |
|---|---|---|---|
| 3,141,170 | 7/1964 | Wilkerson | 346/74.1 |
| 3,142,840 | 7/1964 | Smith | 346/74.1 |
| 3,161,544 | 12/1964 | Berry | 346/74.1 |
| 3,361,878 | 1/1968 | Patterson | 360/64 |
| 4,011,587 | 3/1977 | Arter | 360/70 |

Primary Examiner—Jay P. Lucas
Attorney, Agent, or Firm—James J. Ralabate; John E. Beck; Michael H. Shanahan

[57] ABSTRACT

A variable speed, fixed wavelength magnetic imaging system is provided by generating a signal having a frequency proportional to the speed of a rotational recording member and using that signal to provide a recording frequency of fixed wavelength.

1 Claim, 3 Drawing Figures

ROTARY HEAD MAGNETIC RECORDING AT FIXED WAVELENGTH WITH VARYING SPEEDS

BACKGROUND OF THE INVENTION

This invention relates to magnetic imaging and more particularly to magnetic recording with a fixed wavelength, independent of speed variations in a rotational recording member.

There has recently been introduced a magnetic imaging system which employs a latent magnetic image on a magnetizable member which can then be utilized for purposes such as electronic transmission or in a duplicating process by repetitive magnetic toning and transfer of the developed magnetic latent image. Such latent magnetic image is provided by any suitable magnetization procedure whereby a magnetized layer of marking materials is magnetized, such magnetism transferred imagewise to the magnetic substrate. Such a process is more fully described in U.S. Pat. No. 3,804,511 to Rait et al. Such a process requires the utilization of an original image, creating a duplicate of the original image in magnetizable marking material, magnetizing the magnetizable marking material, and then transferring the signal from the magnetized marking material to a magnetizable member.

In magnetic recording systems conventional to audio and visual recording systems, the magnetic signal is recovered by an electronic "reading" head which reconstructs the desired signal into an appropriate audio or visual electronic signal. These conventional systems depend upon recording the magnetic signals on a magnetizable member in "tracks" which are separated from one another by spacings or "guard bands" of the magnetizable member surface bearing no magnetic signal. These "guard bands" are absolutely necessary so that the "reading" head can accurately reconstruct the desired magnetic signal from the "track" that it is reading without being affected by the fringing magnetic fields from adjacent tracks.

In an imaging system wherein the magnetic latent image is desirably rendered visible with magnetic toner, as opposed to the conventional audio and visual magnetic recording systems, the presence of "guard bands" are highly undesirable because magnetic toner is not attracted thereto. This phenomenon is detrimental to visible imaging schemes relying upon magnetic marking materials to develop a magnetic latent image since it leads to streaks or image deletions, especially in solid areas, upon development of the magnetic latent images.

Furthermore, amplitude modulated recording conventional to audio magnetic recording and disclosed in U.S. Pat. Nos. 3,013,124; 3,479,036 and 3,275,757 are not desirable for visible development of magnetic latent images. This is so because latent magnetic images for visible development are characterized by very high gamma and little or no "grey" scale can be maintained by using an amplitude varying signal. Accordingly, an amplitude modulated magnetic image would result in loss of good solid area coverage upon development with a magnetic marking material.

The present invention provides an improved magnetic latent image capable of being rendered visible with magnetic marking material without image deletion and obviating the need for guard bands by insuring alignment of pixels in the recording tracks thereby eliminating interference between magnetic fields of adjacent tracks. This is accomplished by mounting an optical encoder on the same shaft upon which is mounted a rotating recording member and combining the optical encoder output with the image data signal to produce a third signal which is at the frequency of the first signal. This third signal is inputted into the record head write drivers. This maintains a fixed recording wavelength, independent of the revolutionary speed of the rotating recording member and insures alignment of the recording tracks.

U.S. Pat. No. 3,600,508 discloses the use of a photo encoder for speed control of a magnetic recording; and, U.S. Pat. No. 3,634,776 discloses the use of modulated illumination of a photoconductive cell to vary an oscillator frequency. There appears to be no disclosure or suggestion of the problems addressed by the present invention or the solution provided by the present invention.

SUMMARY OF THE INVENTION

Therefore, an object of this invention is to provide an improved latent magnetic image.

Another object of this invention is to eliminate guard bands in latent magnetic images.

A further object of this invention is to insure alignment of recorded tracks in latent magnetic images.

Still, another object of the present invention is to maintain a fixed wavelength of recording independent of revolutionary speed of a rotating recording member.

These objects and others are provided in accordance with the practice of the present invention by utilizing an optical encoder mounted with a rotating disc on the shaft of a rotating recording member for generating a signal having a frequency proportional to the disc speed and using this signal to control the record frequency.

DETAILED DESCRIPTION OF THE PREFERRED EMBODIMENTS

Figure 1:
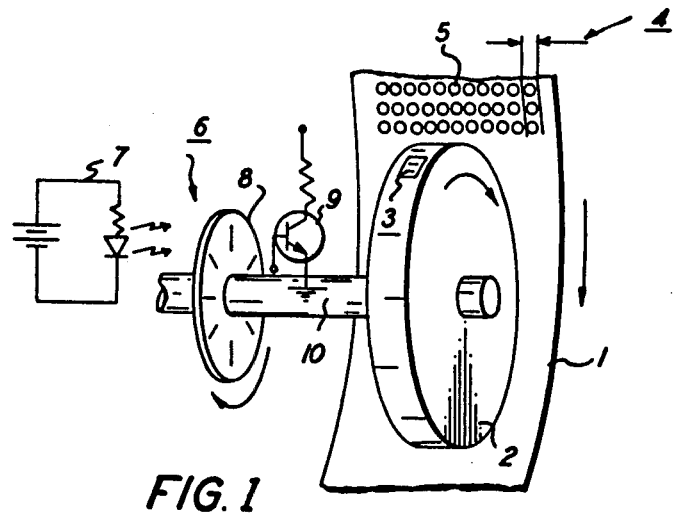
FIG. 1 is a schematic illustration of the optical encoder, disc and rotating recording member used in the present invention.

Referring to FIG. 1, the record head 3 for a direct recording rotating disc 2 is located on the outer circumference. A requirement for synchronization of pixels 5 between recording tracks 4 of a latent magnetic image on a magnetizable recording member 1 is that the wavelength being recorded must remain constant. The wavelength ($\lambda$) in centimeters is:

$$\lambda = \pi d \, rps/F$$

where d and rps are the diameter and revolutions per second of the rotating recording member, respectively, and F is the record frequency in Hertz. Hence, a constant ratio between the rps of the disc and the recording frequency must be maintained in order to provide a constant wavelength recording.

The optical encoder 6 comprises stationary light emitting diode 7 mounted within the recording device containing rotating recording member 2 and positioned to direct light upon mask 8. Mask 8 is a disc mounted upon the same shaft as is mounted rotating recording member 2. Mask 8 comprises alternating transparent and opaque portions extending radially along its surface so as to alternatingly transmit and block light from LED 7. Light transmitted through mask 8 intercepts photo-transistor 9 causing voltage and current changes in the collector circuit of the photo-transistor. Since each transparent portion of mask 8 is followed by an opaque portion, the light transmitted through mask 8 as it revolves is chopped into pulses or bits of light having a frequency dependent upon the speed of rotation of the shaft upon which it is mounted and the number of transparent and opaque portions on the mask.

For example, if the shaft were rotating at 600 rpm (10rps) and mask 8 had only 1 transparent and 1 opaque portion then the optical bit frequency of light impinging the photo-transistor would be 10 Hz; with 2 transparent and opaque portions on mask 8, the optical bit frequency would be 20 Hz, and so forth. Also, for any given mask, the optical bit frequency is directly proportional to the speed of rotation of the shaft and increases and decreases with the rotational shaft speed; doubling when the speed doubles, halving when the speed halves.

Figure 2:
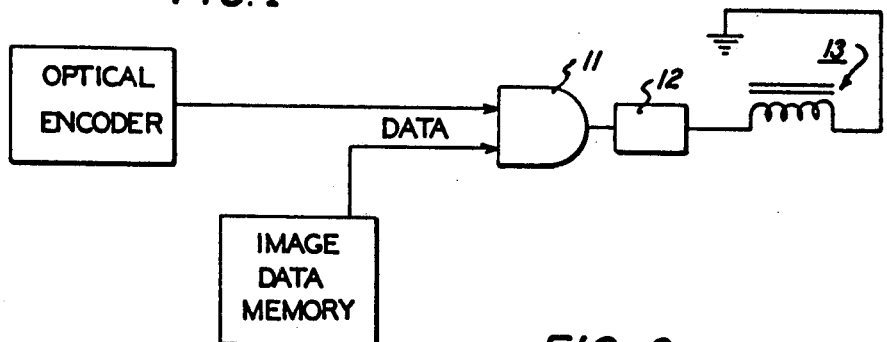
FIG. 2 is an illustrative block diagram for the practice of the present invention.

Thus, a square wave of optical bits is created to impinge photo-transistor 9 and having an rps to f ratio (f = optical bit frequency) which is constant or fixed. The resulting aforementioned voltage and current changes in the collector circuit of photo-transistor 9 occur at the same frequency and F (previously defined.) = f. Since the rps to f ratio is fixed, the rps to F ratio is also fixed and $\lambda = \pi$ dC where C is a constant value = rps/F for varying rotational speeds of the shaft The output of the photo-transistor 9 collector circuit is gated to the write driver through an AND gate 11. As shown in FIG. 2, the optical encoder output and image data input are inputted into AND gate 11. When a stream of image data is fed into AND gate 11 by the image data memory both inputs to AND gate 11 are at the same binary state of 1 and AND gate 11 produces an output which is fed into write driver 12 which drives record head 13 at the F = f frequency.

Thus, the record head recording frequency = F satisfying the requirement for constant wavelength recording at variable rotational speeds for the recording member.

Figure 3:
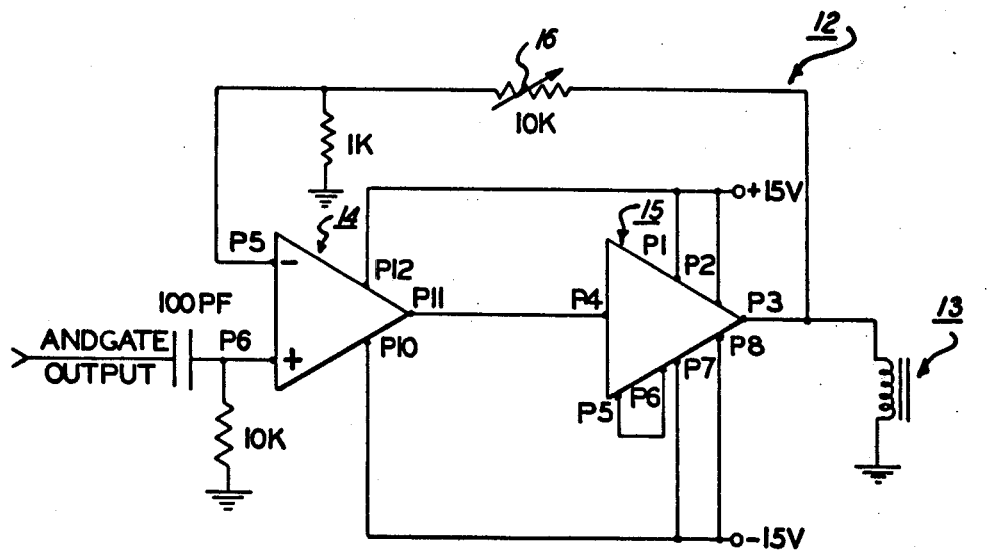
FIG. 3 is an illustrative circuit schematic for the write driver of FIG. 2.

Referring now to FIG. 3, there is seen a schematic diagram of a typical suitable circuit for use as a write driver in the present invention. The output of AND gate 11 is feed into the circuit of FIG. 3. The write driver of FIG. 3 comprises an operational amplifier 14 and a current amplifying buffer 15.

It will be appreciated that FIGS. 1, 2 and 3 are illustrative of the invention, only, and that other circuits can be devised to achieve the function and purpose of the present invention upon a reading of the present description. As an illustrative example of one operational embodiment of the present invention, the following components are identified. Optical encoder 6 in FIG. 1 can suitably comprise an optical encoder available from Renco Corporation of Galeta, CA under Item No. KT23A-1000-3C-18-1-G-½; and gate 11 in FIG. 2 can suitably comprise an AND gate available from either Texas Instruments Corporation or Fairchild Corporation under Item No. 7408; operational amplifier 14 in FIG. 3 is available from National Semi-conductor under Item No. LH0032; and, current amplifying buffer 15 is available from National Semi-conductor under Item No. LH0063.

Returning now to FIG. 3, in operation, the output of the write driver is fed to record head 13. Negative feedback of the output of the write driver is fed back to pin P5 of the operational amplifier through trimming potentiometer 16. Trimming potentiometer 16 is adjusted to adjust the overall gain of the write driver. The output of AND gate 11 of FIG. 2 is fed into pin P6 of operational amplifier 14 through a DC blocking capacitor. The 10K ohm resistor and the 1K ohm resistor form voltage dividers across which voltages are dropped to achieve suitable levels of voltage at pins P6 and P5 of operational amplifier 14. The output of operational amplifier 14 is taken from pin P11 thereof and fed into pin P4 of current amplifying buffer 15. The output of the write driver is taken from pin P3 of current amplifying buffer 15.

Thus, in accordance of the practice of the present invention, a variable speed, fixed wavelength magnetic recording system is provided by generating a signal having a frequency proportional to the speed of a rotational recording member and using that signal as the recording frequency. Optical encoder 6 constitutes means for generating a signal having a frequency proportional to the rotational speed of the rotational recording member 2; and AND gate 11 constitutes means for synchronizing that signal with image data to be recorded; and write driver 12 constitutes means for coupling the synchronized signal output of AND gate 11 to record head 13 and for driving record head 13 at the frequency of the synchronized signal.

Other modifications and ramifications of the present invention will occur to those skilled in the art upon a reading of the present disclosure.

For example, the AND gate 11 of FIG. 2 can be replaced with a summing up amplifier which produces an output when the sum of the optical encoder voltage and the data voltage exceed a predetermined level. Furthermore, the particular component devices and circuitry used in describing the preferred embodiment of the present invention are digital in nature, producing outputs which are graphically represented as pulses. It will be appreciated that an analog equivalent of the circuit could be utilized. However, a digital circuit is preferred because the output pulses provide many sharp "edges" in the output signals which ultimately result in sharp reversal of current direction through the record head 13. This sharp reversal of current results in many "edges" or magnetic field graidents being recorded on the magnetizable recording member. Therefore, a digital system does result in many pixels of sharply defined boundaries which provides better quality control over magnetic images.

It will be appreciated that the word "frequency" when applied to the preferred digital embodiment described herein, means that the output pulse period and pulse width are identical to those of the optical encoder output when the data signal is at a proper level for producing an output from the AND gate; or, when the sum of the voltages at the inputs to a summing amplifier are sufficiently high to produce an output.

Other modifications and ramifications within the spirit of the invention will become apparent during a reading of the present disclosure. These are intended to be within the scope of the present invention.

For example, optical encoder 6 of FIG. 1 need not be limited to the optical transparency mask and photo-transistor but can comprise an opaque or transparent disc having light reflective markings thereon wherein the reflection of light from the markings is intercepted by the photosensitive detector (e.g., phototransistor).

Furthermore the encoder need not even be optical but can be magnetic. For example, a disc of non-magnetic material can have markings of magnetic material thereon and the photosensitive detector can be replaced by a magnetic pick-up, typically a coil in which current is generated by intercepting magnetic fields.

What is claimed is:

1. In magnetic imaging apparatus of the type wherein latent magnetic images are composed with magnetic pixel elements recorded on a magnetizable member at a given spatial frequency along generally parallel tracks in response to image data signals representative of the pixel elements applied to a drive circuit of a rotating, magnetic writing head whose rotational speed effects the spatial frequency of the pixel elements and wherein the rotating writing head and magnetizable member are supported for relative movement to construct the parallel tracks, the improvement being apparatus for maintaining constant the spatial frequency of the recorded pixel elements despite variations in the rotational speed of the rotating writing head comprising encoder means coupled to the rotating writing head to generate a first signal having a frequency directly proportional to the rotational speed thereof and logic AND gate means for combining said first and image data signals to generate a third signal having the same frequency as the first signal coupled to the drive circuit for the writing head whereby the resultant recorded pixel elements have a constant spatial frequency.

* * * * *